United States Patent [19]

Frey, Jr. et al.

[11] Patent Number: 5,230,047
[45] Date of Patent: Jul. 20, 1993

[54] METHOD FOR BALANCING OF DISTRIBUTED TREE FILE STRUCTURES IN PARALLEL COMPUTING SYSTEMS TO ENABLE RECOVERY AFTER A FAILURE

[75] Inventors: Alexander H. Frey, Jr., Pasadena; Richard C. Mosteller, Sierra Madre, both of Calif.

[73] Assignee: International Business Machines Corporation, Armonk, N.Y.

[21] Appl. No.: 510,209

[22] Filed: Apr. 16, 1990

[51] Int. Cl.$^5$ .............................. G06F 11/00
[52] U.S. Cl. ................. 395/575; 364/DIG. 1; 364/264; 364/265; 364/267; 364/282.1; 364/282.4
[58] Field of Search ............. 364/DIG. 1 MS File, 364/DIG. 2 MS File; 371/6, 7, 8.1, 8.2, 9.1, 10.1, 10.2, 11.1, 11.3, 12, 13, 14; 395/200, 325, 575, 600, 800, 400

[56] References Cited

U.S. PATENT DOCUMENTS

| | | | |
|---|---|---|---|
| 4,412,285 | 10/1983 | Neches et al. | 364/200 |
| 4,445,171 | 4/1984 | Neches | 364/200 |
| 4,575,798 | 3/1986 | Lindstrom et al. | 395/600 |
| 4,766,534 | 8/1988 | DeBenedictis | 364/200 |
| 4,825,354 | 4/1989 | Agrawal et al. | 364/200 |
| 4,860,201 | 8/1989 | Stolfo et al. | 364/200 |
| 5,020,059 | 5/1991 | Gorin et al. | 364/DIG. 1 |

OTHER PUBLICATIONS

Knuth, "The Art of Computer Programming", vol. 3 Sorting and Searching, Addison-Wesley Publishing Co., 1973, pp. 473-479.

*Primary Examiner*—Robert B. Harrell
*Attorney, Agent, or Firm*—Perman & Green

[57] ABSTRACT

A distributed network is described which contains a plurality of interconnected nodes each node including a processor and data storage apparatus. A plurality of key-index data identifiers are distributed among the nodes, with each node including a tree data structure in non-volatile storage defining locations of the key-index data identifiers. The tree data structure includes a ROOT data structure comprising two lists, "NEW ROOT" and "OLD ROOT", each comprised of an ordered array of boundaries assigned nodes for the top level of the tree. A method is described for balancing the tree data structure which comprises the steps of:

a. a providing in each of the nodes across which the key-index data identifiers are distributed, at least copies of the two lists, "NEW ROOT" and "OLD ROOT", of the ROOT data structure;

b. determining when a first node contains an excess of key-index data identifiers;

c. moving the excess of key-index data identifiers to a second node;

d. updating the first node/second node boundary value in "NEW ROOT" of the ROOT data structure and the copies of "NEW ROOT" in the first and second nodes to note the movement of the data file identifiers, whereby in the event of a malfunction of one of the nodes, a record exists in both of the nodes of both an updated and non-updated ROOT data structure to enable data recovery.

11 Claims, 6 Drawing Sheets

METHOD FOR BALANCING OF DISTRIBUTED TREE FILE STRUCTURES IN PARALLEL COMPUTING SYSTEMS TO ENABLE RECOVERY AFTER A FAILURE

This invention relates to improvements in parallel computing systems, and, more particularly, to a method for balancing distributed file structures in a manner to enable recovery of data in the event of a failure.

BACKGROUND OF THE INVENTION

Data structures in computer systems often use tree-organizations to enable search paths to be determined to specific information. A file contains whatever information the user places in it (e.g., an executable program), and may be stored anywhere in the memory of a data processing system. Directories provide the mapping between a file's name or other indicator and the file itself. Within a tree-organized search structure, a "ROOT" is generally found which enables all information to be located by tracing a path through a stated chain of branches, until the desired information is reached. The ROOT of the tree indicates spans of information handled by each of the subservient branches of the next level so that when a specific information search is specified, a search through the ROOT indicates in which subservient branch in the next level further information concerning the search may be found.

Such a tree-structured information array is often used by a key-index data arrangement which is an array of paired entries. The first portion of the entry is a key value and the second is an index value (such as a record number) associated with that key value. A key-index file is accessed by giving the key, with the system returning the key-index pair. This enables files to be accessed by a key name rather than by a record number or byte number.

In a tree-structured information array used by uni-processor computing systems, structures known as balanced trees (i.e., B-trees) have been utilized. B-trees enable search work to be evenly distributed throughout the tree and prevent portions of the tree from being overloaded, while other portions are sparsely populated. A description of B-trees can be found in "The Art of Computer Programming", Volume 3/Sorting and Searching, D. E. Knuth, Addison-Wesley Company, 1973, pp. 473-479.

Tree structured information arrays in parallel computing systems present significantly different problems than those that are present in uni-processor systems. Such parallel computing systems may include a large number of "nodes" that are interconnected by a high speed communication network. Each node generally comprises a processor and a memory, operates independently, and interacts with other nodes via message traffic and transfers of blocks of data over the communication network.

It may be the case in parallel computing systems that file data structures are distributed throughout a plurality of nodes rather than being centrally located in a single node In addition to enabling more efficient diffusion of work among the nodes, such distributed data structures must provide for system recovery in the event of malfunction of one or more nodes. Tree-structured information arrays are one example of files that may be used in such systems and may be distributed among the nodes. When, however, B-tree structures are employed, problems may occur if, during rebalancing nodes of the tree-structure, a node storing a portion of the tree should fail or the entire system should fail. In such case, it is necessary for the system to know (1) whether there was or was not a rebalancing between different nodes in process; (2) what nodes were involved with the rebalancing effort; and (3) at what state was the rebalancing effort when the failure occurred. Knowing these facts, the system, after the failed node has been recovered or the entire system restarted then must reconstruct itself in a manner so as to continue the rebalancing effort, while not losing data in the process.

Parallel computing systems employing tree-oriented data structures may be found in U.S. Pat. Nos. 4,860,201; 4,766,534; 4,412,285; 4,445,171; and U.S. Pat. No. 4,825,354. In the main, those prior art patents are mainly concerned more with operational message transfers between the nodes of a parallel data processing system rather than recovery of data in the event of a failure.

Accordingly, it is an object of this invention to provide a method for data recovery in a parallel computing network.

It is another object of this invention to provide a method for data recovery in a parallel computing network which employs a B-tree information array file structure.

It is a further object of this invention to provide an efficient method for rebalancing a B-tree file data structure across different nodes in a parallel data computing network.

SUMMARY OF THE INVENTION

A distributed network is described which contains a plurality of interconnected nodes, each node including a processor and data storage apparatus. A plurality of key-index data structures are distributed among the nodes, with each node including a B-tree data structure defining the locations of key-index data structures on that node. The tree data structure includes a ROOT data structure comprising key-index data identifiers and assigned nodes for the top level of the tree. A method is described for balancing the tree data structure which comprises the steps of:

a. providing in each of the nodes across which the data files are distributed, at least a pair of copies of the ROOT data structure;
b. determining when a first node contains an excess of key-index data identifiers;
c. updating one part (called "NEW ROOT") of the ROOT data structure in the file in non-volatile storage containing the key-index file structure, to note the movement of the key-index data identifiers, whereby in the event of a malfunction of one of the nodes, a record exists in both of the nodes of both an updated and non-updated ROOT data structure to enable data recovery;
d. moving the excess of key-index data identifiers to a second node;
e. updating the second copy (called "OLD ROOT") of the ROOT data structure after all the key-index data identifiers have been moved, to indicate that the rebalancing operation has been completed.

DETAILED DESCRIPTION OF THE INVENTION

Figure 1:
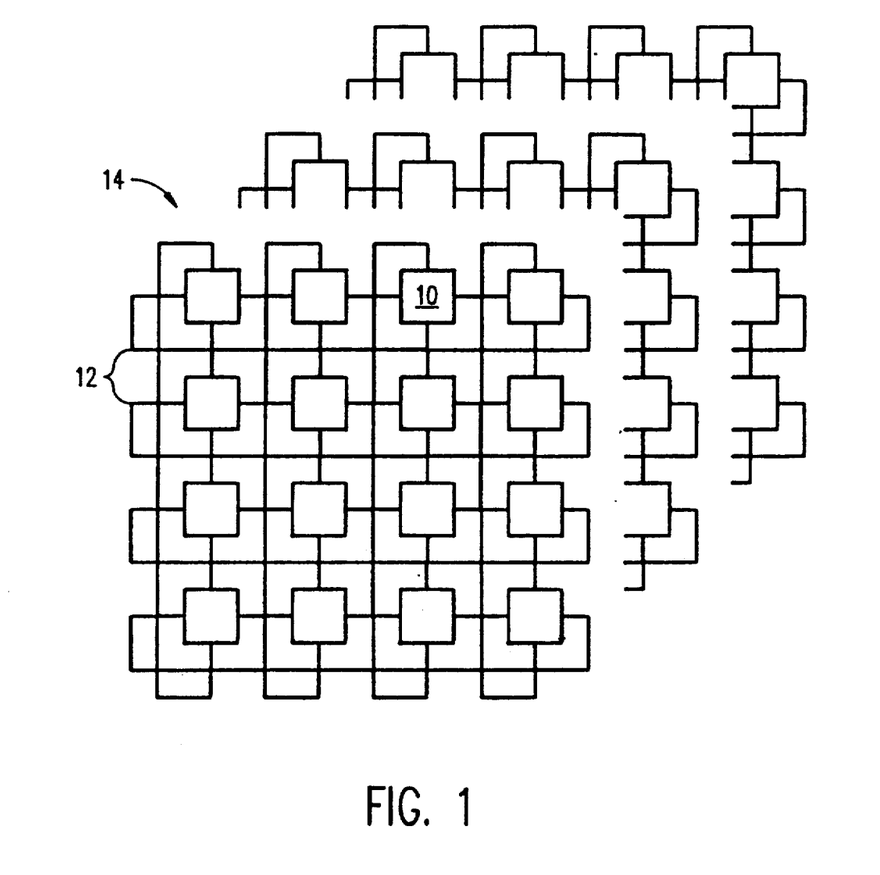
FIG. 1 is a block diagram of a parallel computing system having a three dimensional structure.

In FIG. 1, the topology of a representative three dimensional parallel computing system is illustrated. Each box 10 represents a node and each line 12 represents a communication link between the nodes. It will be noted that the nodes are connected in the form of a torus and, while multiple levels of the parallel computing system are illustrated, interconnections between levels are omitted from the FIG. From a review of the nodes in level 14, it can be seen that each node is connected to an adjoining node in both the X and Y dimension and furthermore, each node has 2 additional links (not shown), one to the counterpart node in the plane above and one to the counterpart node in the plane below.

Figure 2:
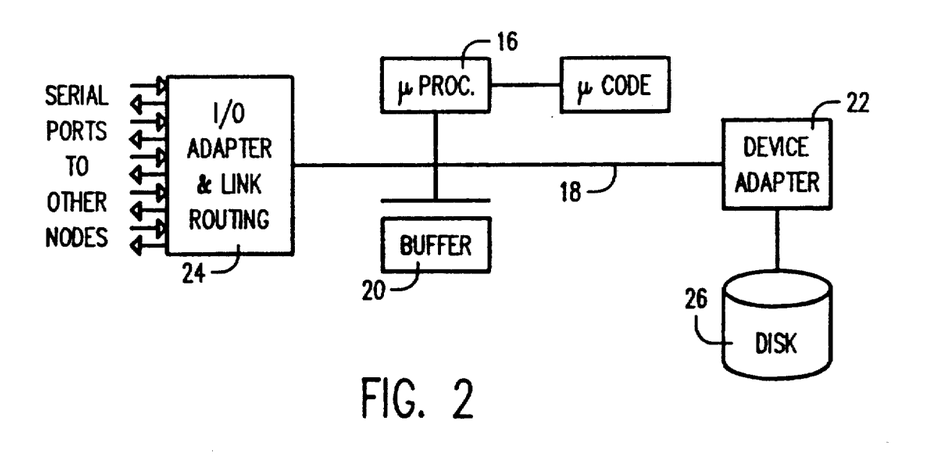
FIG. 2 is a block diagram illustrating the structure of each node in the parallel computing system of FIG. 1.

As shown in FIG. 2, the structure of each node is similar and comprises a microprocessor 16 which is connected via a communication channel 18 to a buffer memory 20, a device adapter 22 and an I/O adapter and link router 24. Connected to device adapter 22 is a disk memory 26. Each node, as shown in FIG. 2, operates substantially independently of other nodes in processing its portion of a program or subroutine.

Key-index data identifiers employed during the operation of nodes 10 are distributed among all nodes so as to balance the work load therebetween. Furthermore, such a distribution of key-index data identifiers throughout the nodal structure insures that the system can recover in the event of single nodal failure, and in certain cases, multiple nodal failures.

When key-index data identifiers are distributed among a plurality of nodes, a plurality of tree-structured arrays are required to enable location of any particular stored key-index data identifier. An efficient structure for keeping track of identifier locations is a B-tree structure. As indicated in the introduction to this specification, a feature of a B-tree structure is that it may be continually rebalanced to assure that no particular node of the tree becomes more heavily populated with key-index data identifiers than any other node. This assures that no node is overloaded with work as compared to all other nodes.

Algorithms are known in the prior art for constructing B-trees and for maintaining them in a balanced or nearly balanced state in uni-processor systems. Nevertheless, when a B-tree structure is employed in a parallel computing system and is, in itself, distributed among the nodes of the parallel computing system, it is vital that it be structured so that if a B-tree rebalance operation that involves more than one node is in-process, then the system state can be determined in the event of a malfunction and system recovery can occur after the malfunction has been corrected.

Figure 3:
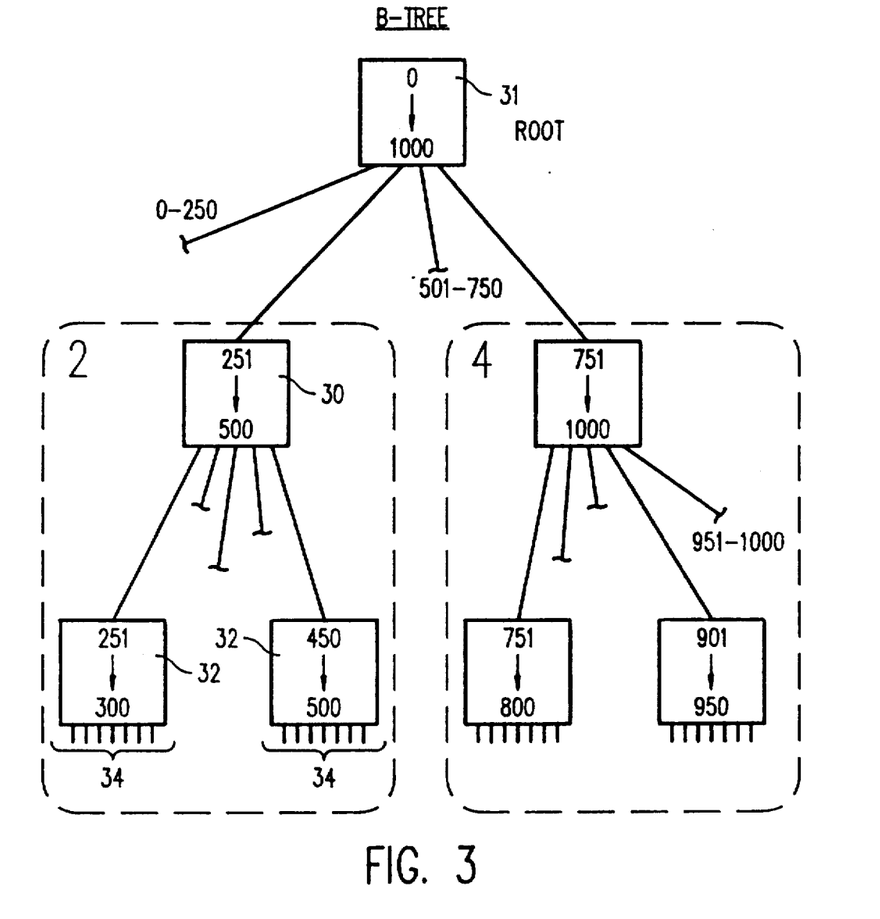
FIG. 3 is a schematic diagram of a B-tree, as configured in a parallel computing system.

In FIG. 3, an illustrative B-tree structure is illustrated. As above described, each entry in the B-tree is a key-index value with the keys generally being listed in sequential order. The uppermost level of the B-tree contains a ROOT directory 31 which indicates, for each span of key values, where in the file system either the next level of directory indications can be found, or where the actual file can be found.

Figure 4:
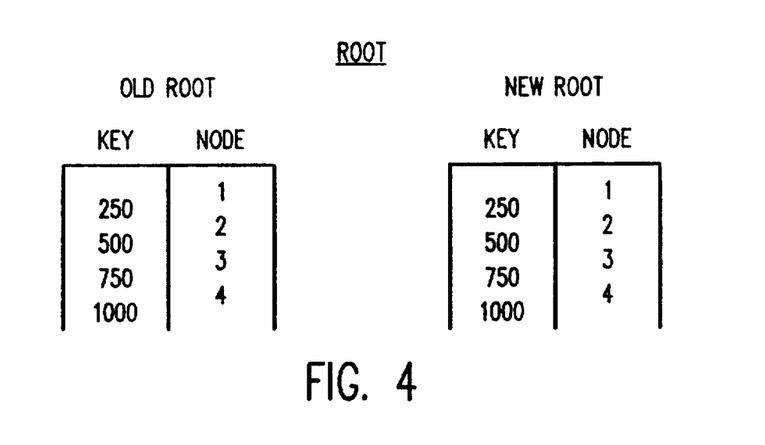
FIG. 4 is a schematic diagram of an exemplary ROOT for the B-tree shown in FIG. 3.

As shown in FIG. 4, the actual structure of a ROOT is two lists, which are initially identical. The first list is a node's "old" initial key value ("OLD" ROOT) and the second list is the node's new initial key value ("NEW" ROOT). A key value of zero is assumed for the first node (Node 1). For instance, in the NEW ROOT list shown in FIG. 4, the first entry is key number 250 and the second is 500. That indicates that key values from 0 to 250 are located in node 1 and that values from 251 to 500 are located in node 2, etc. It is important to realize that only when rebalancing is in process, do the key values in New Root and Old Root differ (i.e. when not rebalancing, old and new initial key values stored in a node are equal).

As shown in FIG. 3, node 2 includes a child branch 30 which in turn, has a plurality of child branches 32. Emanating from each of child branches 32 is a plurality of leafs 34 where the actual key-index file identifiers can be found.

During processing in a parallel computing system, files are mapped into the various nodes in accordance with predetermined characteristics of each file. It can occur, notwithstanding the balanced key-index arrangement which is shown in FIG. 3, that one or more nodes can become unbalanced with respect to another node if too many key-index identifiers are assigned to it. In general, each child branch of the tree is restricted in its fan out, so that as more key-index pairs are assigned to a particular node, additional levels of branching are inserted to accommodate those child branches in which entries overflow the branch's limited fan out.

Within each node, the number of child branch levels can be determined by merely counting the number of key entries. Thus, by one node comparing its number of key entries with the number of key entries in an adjoining node, an unbalance in tree levels can be readily determined and correction instituted. However, if a node is in the process of rebalancing its key entries with an adjacent node and the entire system or the adjacent node malfunctions, the system must be provided with a method and means for data recovery. This recovery method is illustrated in FIGS. 5 and 6.

Figure 5:
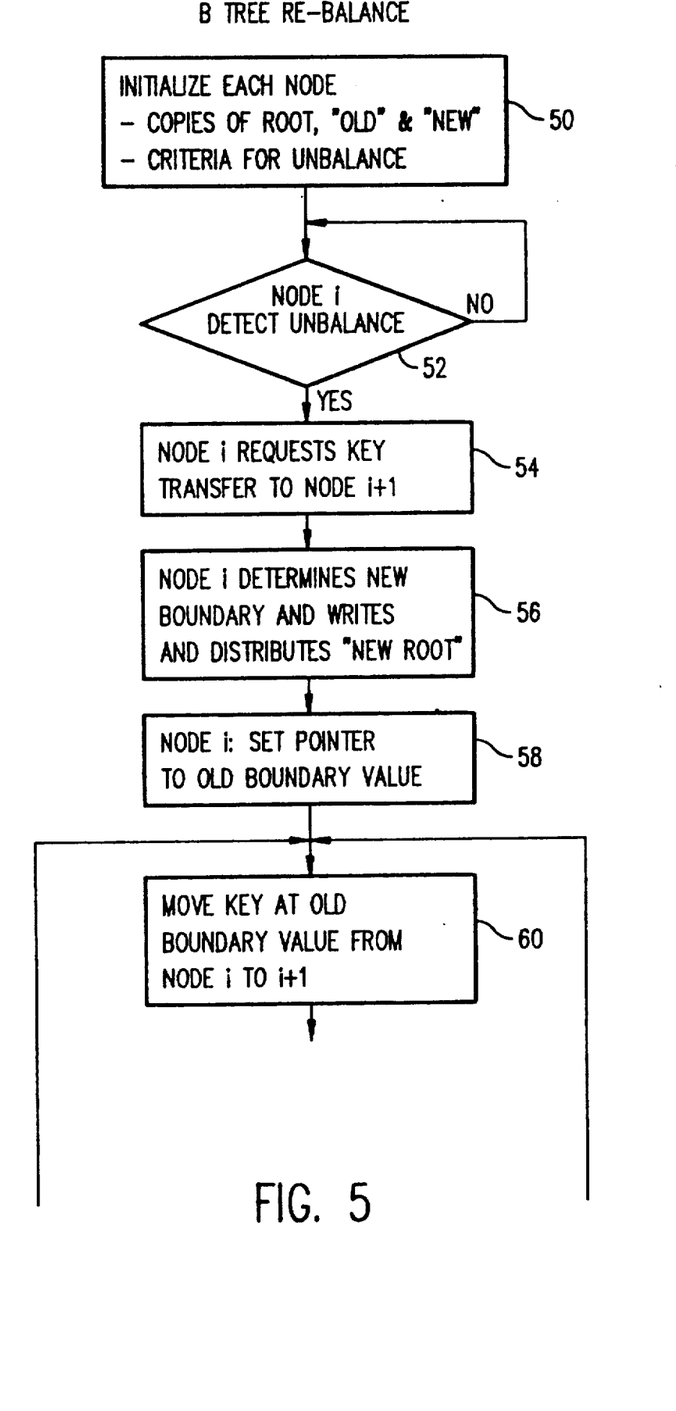
FIGS. 5 and 6 illustrate a high level flow diagram showing the B-tree rebalance algorithm of the invention.
Figure 6:
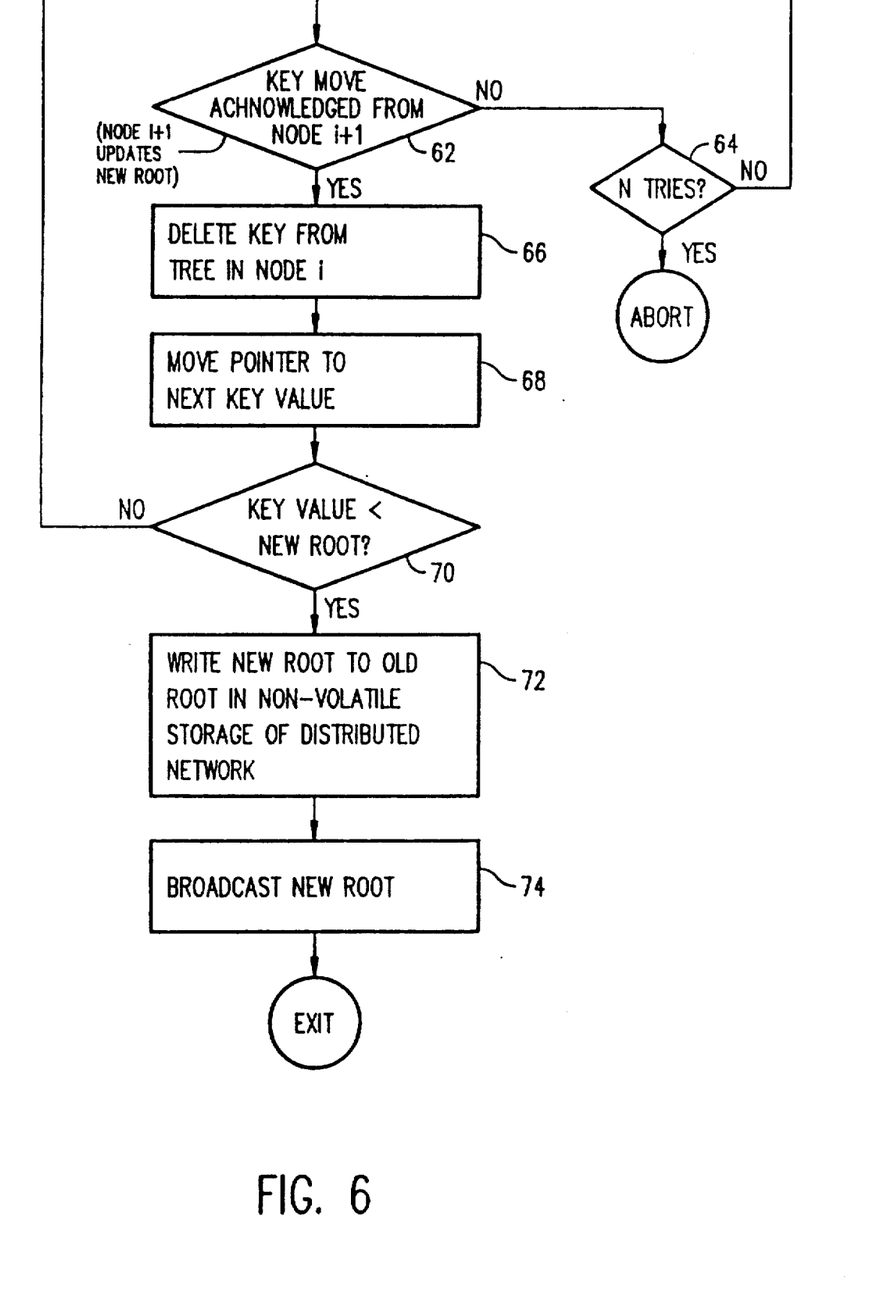

In FIG. 5, box 50 indicates that initially, each node is provided with certain basic data. As part of that data, each node is provided with a copy of ROOT for the B-tree structure. Each node then duplicates that record and designates one copy as OLD ROOT and another as NEW ROOT. Additionally, each node is provided with a criteria for determining its state of balance or unbalance with respect to an adjacent node. That criteria may be the number of keys present in that node, or a percentage of B-tree branches filled up or any other appropriate criteria.

Neighboring nodes continually exchange information regarding their state with regards to the unbalance/balance criteria. In other words,. messages are frequently passed between adjacent nodes enabling the nodes to detect an unbalanced state with respect to an adjacent node. Each node checks its number of key-index entries and compares that number with the number of entries in an adjacent node. If a node finds that the adjacent node has a lesser number of key-index between the nodes meets a criteria which calls for balancing to commence, the node with "too many" entries commences the transfer action.

For the sake of example, it will be assumed that there are two nodes i.e., node i and node i+1. It will be further assumed that node i detects a tree unbalance (box 52) with respect to adjacent node i+1, in that node i has many more keys than node i+1. (If no unbalance is detected it merely continues exchanging data until it determines that an unbalance does occur). When node i detects an unbalance, it requests to transfer key-indexes to node i+1 (box 54). Node i determines a new ROOT boundary for itself and writes its new boundary value, into its "new ROOT". The creation of the new boundary value within "new ROOT"determines how many keys will be moved from node i to node i+1.

For example, in node i the indicated key values in the first child branch may be from 100 to 145 whereas in node i+1 the key values may only span from 146 to 151. As a result, node i requests to transfer key values 126 to 146 to node i+1, thereby causing a readjustment in the node i lower boundary from 146 to 126. To do this, Node i writes 126 into its list of boundary values called "NEW ROOT". Thus, by establishing, the new boundary value of 126, node i indicates that it will be transferring keys between 126 and 146 to node i+1. At this point, node i sets an internal pointer equal to its current boundary value, say, for instance, key-value 145 (box 58).

Then, node i moves the key at the current boundary value (145) from itself to node i+1 (box 60). Node i+1, upon receiving the key and storing it to disk, acknowledges receipt of the key (decision box 62) and updates its copy of New Root to indicate the newly received key.

If node i does not receive a move acknowledgement from node i+1, it repeats the attempt to move the key (decision box 64). If n retries have not occurred, the program recycles to box 60 until n tries have occurred, at which point node i issues an abort indication.

Assuming that the key move is acknowledged, node i deletes that key from its tree (box 66), and moves the pointer to the next key value, e.g., 144, (box 68). Node i then determines whether the that key value is less than its NEW ROOT boundary (decision box 70). If the answer is no, the key is transferred, and the algorithm recycles back to box 60. If the value of the key is found to be less than the NEW ROOT, the transfer process is complete and the algorithm proceeds to box 72 where both nodes i and i+1 write the new ROOT value over old ROOT. At this stage, a broadcast is made to other nodes of the value of new ROOT so that other nodes can then update their local copes of the values of ROOT.

Figure 7:
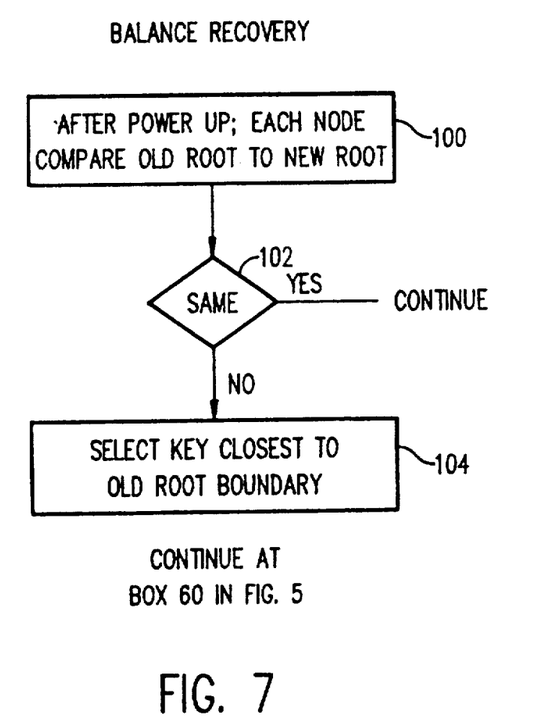
FIG. 7 is a logic flow diagram showing system recovery after a power-down.

It can be seen from the above, that when node i starts sending keys, one by one, to node i+1, node i requests node i+1 to insert those keys in its part of the B-tree, but node i does not immediately remove those keys from its part of the B-tree. When insertions occur into the B-tree in node i+1, the temporary boundary pointer in node i+1 and the temporary boundary pointer in node i change to reflect those insertions. During this period, other nodes can still access the part of the B-tree belonging to nodes i and nodes i+1 since nothing has been deleted from either node. At the same time, new ROOT reflects insertions are being made into node i+1. If either of the nodes goes down during this period, it can recover when it comes up and sees that new ROOT and old ROOT have different values For instance, see FIG. 7 wherein at power up, each node compares its OLD ROOT values to its NEW ROOT values (box 100). If the values are the same (decision box 102) then the node continues and no rebalancing is required. On the other hand, if the values are determined to be different, the node selects its key closest to the OLD ROOT boundary (box 104) and continues the rebalancing process as shown at boxes 60 et sequence in FIGS. 5 and 6.

Figure 8:
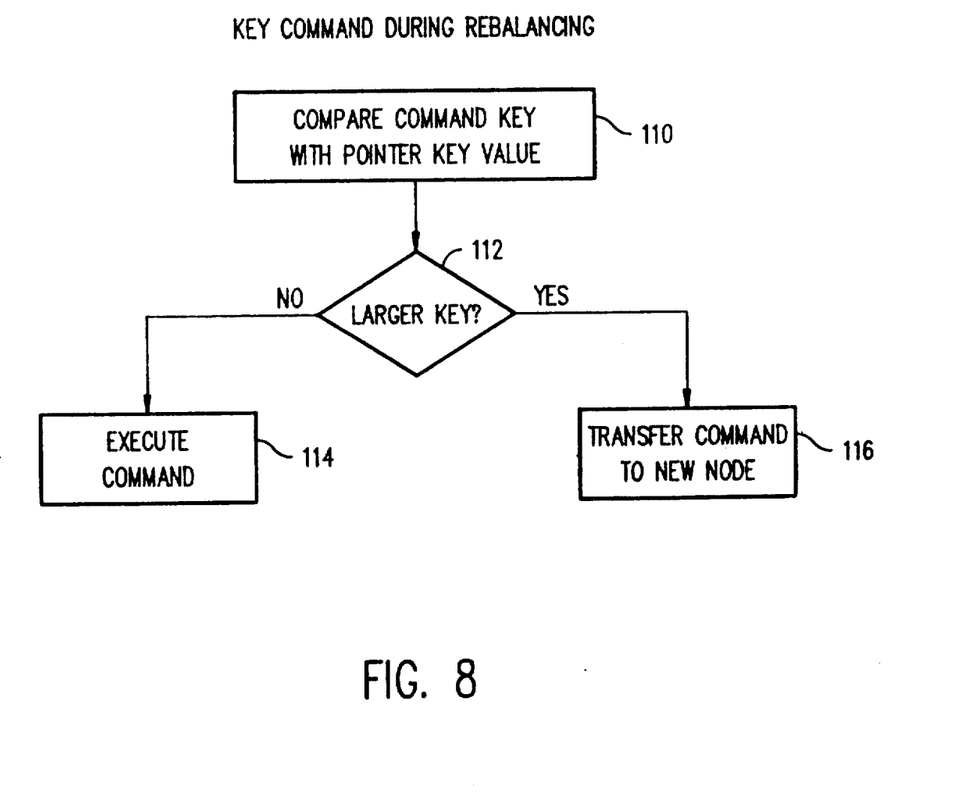
FIG. 8 is a logic flow diagram illustrating a node's operation when a data insertion or extraction is encountered during rebalancing.

As above stated, once all of the keys that are being moved become inserted in the B-tree of node i+1, node i+1 overwrites its OLD ROOT value with the NEW ROOT value and propagates its NEW ROOT value throughout the system. Once the NEW ROOT value is propagated to other nodes, all queries related to the part of the tree that has been moved are addressed to node i+1. However, if a key insertion or deletion from another node occurs during rebalancing, the procedure shown in FIG. 8 occurs. The value of the key being inserted is compared with the pointer to the next key to be transferred. If the key value is found to be larger (box 112), then the node transfers the key to the node having the proper span of key values. If, on the other hand, it is found to be smaller in value than the next key to be transferred, then the node inserts the key in its B-tree (box 114).

To summarize, the pointer separating the part of the B-tree that has already been copied to another node from the part that still has not been copied enables any insertion or deletion to be properly directed. Thus, whenever an insertion or deletion operation is received at a node, it is forwarded to a new node if the part of the B-tree that belongs to the node receiving the insertion or deletion instruction has been copied to the new node.

As can now be seen, B-tree balancing results in B-trees being in a continuous rebalancing state, i.e., they exchange information regarding their unbalanced criteria on a continuous basis and whenever one node has been overfilled, they initiate rebalancing. Furthermore, if any node crashes during the rebalancing procedure, the values of NEW ROOT and OLD ROOT enable it to either continue its rebalancing effort or not, as the case may be.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a distributed computing network containing a plurality of interconnected nodes, each node comprising a processor and data storage means, a plurality of data files or non-volatile storage distributed among said nodes including a tree structure of key-index data, said tree structure of key-index data including a ROOT of the tree structure for a top level of the tree, a method for balancing, among nodes, said tree structure, comprising processor executed steps of:

a. providing said ROOT in a file in a non-volatile storage, said ROOT including first and second lists, each being a list of keys describing a distribution of key-index data indentifiers are distributed, copies of said ROOT;

c. determining if a first node contains an excess of said key-index data indentifiers in comparison to a second node;

d. upon a determination of said excess, moving said excess key-index data indentifiers to non-volatile storage on said second node to achieve an approximately balanced distribution thereof; and e. updating said second lists in files containing copies of said ROOT in said first and second nodes by noting each move of a key index data identifier, whereby upon a malfunction of either said first or second node before said approximate balance is achieved, a difference in entries exists between said first and second lists in a ROOT file in a non-failed first or second node that enables system recovery.

2. The method as defined in claim 1 wherein said ROOT contains an indication of key-index data identifier boundary values in each said node, wherein step c further comprises the step of:

c1. establishing a new boundary value for said first node in said second list of said ROOT to enable a determination of key-index data identifiers to be moved from said first node.

3. The method as defined in claim 2 wherein step (e) includes further the steps of:

e1. in said first node, establishing a pointed to indicate a next key-index data identifier to be moved; and e2. establishing a pointed in said second node, indicating a key-index data identifier boundary after moving a key-index data identifier into said second node from said first node.

4. The method as defined in claim 3 further including the steps of:

e3. deleting a key-index data identifier in said first node when said first node receives from said second node an acknowledgement of receipt of said key-index data identifier; and e4. moving said pointer in said first node to a next key-index data identifier to be moved, until said pointer reaches said new boundary value.

5. The method as defined in claim 4 comprising the further step of:

f. in the event of a malfunction in a node, determining if a rebalancing was in process between nodes by comparing, in each said node, the first and second lists of said ROOT data structure to determine identify or non-identity thereof.

6. The method as defined in claim 5 comprising the further step of:

g. upon a determination in any said node of non-identity in said first and second lists, performing steps e1–e4, starting with a non-identical key-index data identifier in said second list found in step f.

7. The method as defined in claim 6, further comprising the steps of:

h. terminating said step g in a said node when said pointer indicates a key-index data identifier whose value is less than a said boundary value established in step c1.

8. The method as defined in claim 1 wherein said moving step (d) includes the further step of:

d1. retaining in said first node a copy of each key-index data identifier moved to said second node until acknowledgement of receipt and storage of a moved key-index data identifier in said second node is received.

9. The method as defined in claim 8 comprising the further step of:

f. upon all said excess key-index data identifiers having been moved to said second node, writing an updated copy of said second list in place of said first list in said ROOT data structure in non-volatile storage for said tree of key-index data identifiers.

10. The method of claim 9, further comprising the step of:

g. propagating to all nodes said updated copy of said ROOT data structure.

11. The method as defined in claim 1, further comprising the steps of:

f. responding to a key-index data identifier movement command transmitted to said first node from a node not involved in said balancing, by determining if the portion of said tree data structure in which said command is sought has been moved to said second node and, if so, redirecting said key-index data identifier command to said second node.

* * * * *

UNITED STATES PATENT AND TRADEMARK OFFICE
CERTIFICATE OF CORRECTION

PATENT NO. : 5,230,047
DATED : 7/20/93
INVENTOR(S) : Frey, Jr. et al.

It is certified that error appears in the above-identified patent and that said Letters Patent is hereby corrected as shown below:

In Col. 7, line 1, after the word "identifiers", insert --among said nodes;

b. providing in files in each of said nodes across which said key-index data identifiers--.

In Col. 8, line 5, change "identify" to --identity--.

Signed and Sealed this

Fifteenth Day of February, 1994

Attest:

BRUCE LEHMAN

Attesting Officer

Commissioner of Patents and Trademarks